US008283886B2

(12) United States Patent
Tsai

(10) Patent No.: US 8,283,886 B2
(45) Date of Patent: Oct. 9, 2012

(54) CHARGING DEVICE FOR BATTERY

(76) Inventor: Ming-Wei Tsai, Taipei County (TW)

( * ) Notice: Subject to any disclaimer, the term of this patent is extended or adjusted under 35 U.S.C. 154(b) by 391 days.

(21) Appl. No.: 12/623,426

(22) Filed: Nov. 22, 2009

(65) Prior Publication Data
US 2011/0121788 A1   May 26, 2011

(51) Int. Cl.
*H01M 6/50* (2006.01)
(52) U.S. Cl. ......................................................... 320/100
(58) Field of Classification Search .................... 320/100
See application file for complete search history.

(56) References Cited

U.S. PATENT DOCUMENTS

| | | | | |
|---|---|---|---|---|
| 5,932,988 A * | 8/1999 | Landon et al. | ................ | 320/100 |
| 7,508,167 B2 * | 3/2009 | Meyer et al. | ................... | 320/125 |
| 7,612,523 B2 * | 11/2009 | Li | ................................. | 320/100 |
| 7,825,615 B2 * | 11/2010 | Chen et al. | ..................... | 318/139 |
| 2007/0096690 A1 * | 5/2007 | Casalena et al. | ............... | 320/112 |
| 2007/0278990 A1 * | 12/2007 | Raichle et al. | ................ | 320/104 |
| 2008/0042619 A1 * | 2/2008 | Li | ................................. | 320/136 |

* cited by examiner

*Primary Examiner* — Ramy Ramadan
(74) *Attorney, Agent, or Firm* — Lin & Associates IP, Inc.

(57) ABSTRACT

A charging device for charging primary cells includes a transforming rectifying unit, a voltage current processing unit, a microprocessor, an agitating unit, a detecting unit and a display unit. The transforming rectifying unit transforms an input power source into a direct-current output power source, which is transformed by the voltage current processing unit into a direct-current power source and charging power source. The charging power source is used for charging the battery set. The detecting unit detects an output voltage of the battery set and produces a detecting signal. The microprocessor controls an overall charging operation of the charging device according to the detecting signal, including making the agitating unit produce a sine pulse to chemically activate the battery set to remove the carbon deposition, and making the display unit show the charging status.

13 Claims, 1 Drawing Sheet

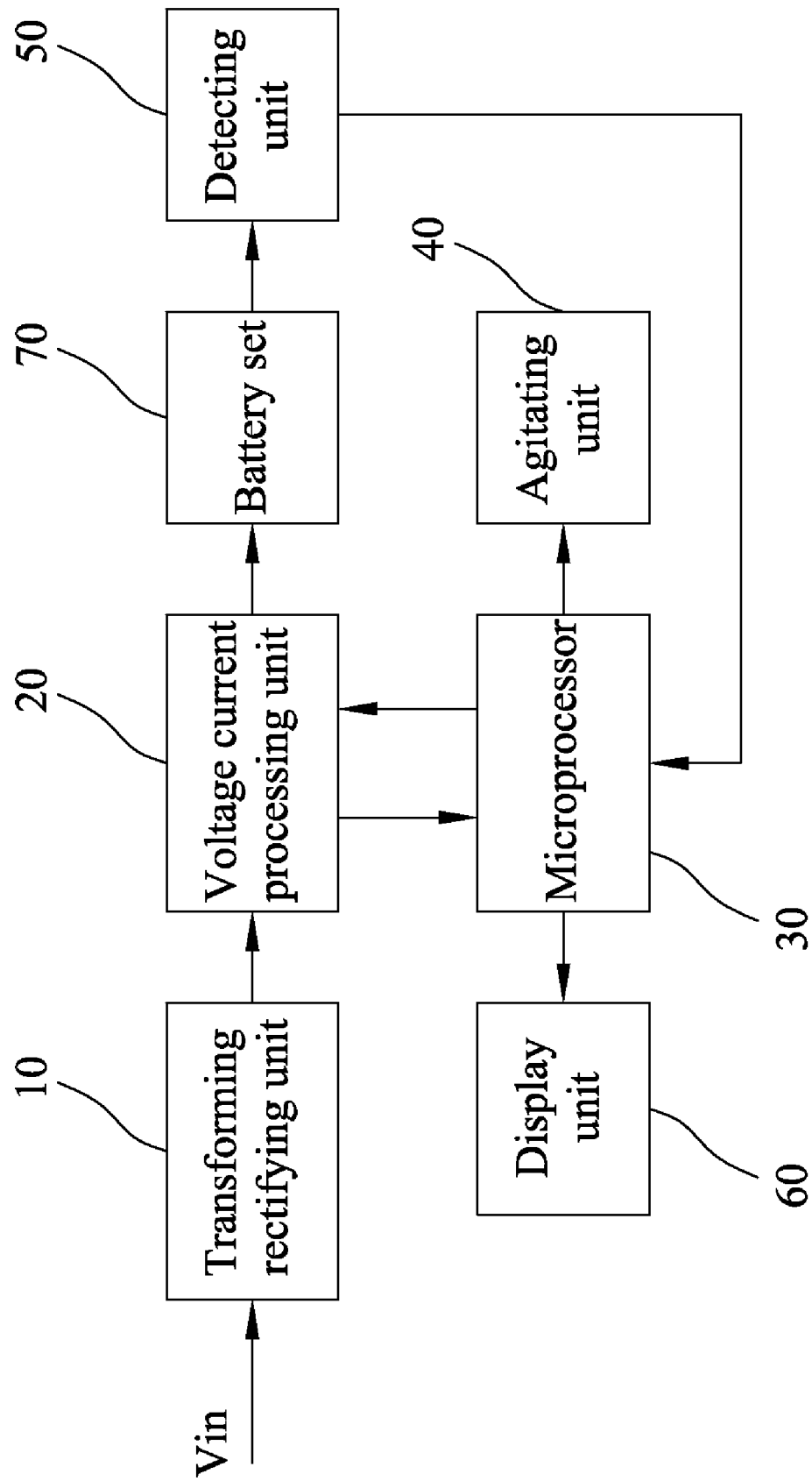

US 8,283,886 B2

CHARGING DEVICE FOR BATTERY

BACKGROUND OF THE INVENTION

1. Field of the Invention

The present invention relates to a charging device for a battery, and in particular to a battery charging device for charging and rejuvenating a primary cell, such as a zinc-manganese alkaline battery.

2. The Prior Art

As technologies progress, electronic devices have been applied to various fields, especially to portable devices, such as radios, portable video game players, mobile phones, video cameras, cameras and electronic toys. Generally speaking, these portable devices need batteries to provide power. Primary cells (disposable batteries), such as zinc-carbon batteries and zinc-manganese alkaline batteries, are widely used because of their low cost and constant output electric power.

When discharging, the internal resistance of the primary cell will increase due to the electrochemical reaction. Thus, the output voltage decreases. When the output voltage decreases to a critical voltage, the output voltage is not large enough to make an electronic device work normally. Although the primary cell can still provide a smaller output voltage, the primary cell having a smaller output voltage is replaced with a new one. Also, the primary cell can not be reused, therefore it is thrown away. Annual yield of primary cells is numerous, and therefore the discarded primary cells cause a great burden on the environment.

Although secondary cells (rechargeable batteries), such as nickel-metal hydride batteries, nickel-cadmium batteries and lithium-ion batteries, may be reused through charging, the price of the secondary cells is much higher than the primary cells. It takes about 4 to 8 hours to fully charge the secondary cells, and the secondary cells can only be charged less than 100 times. The secondary cells have other disadvantages. Take a nickel-metal hydride battery as an example, it has a voltage of 1.2V, which is different from the 1.5V of a primary cell, thus it may not be used in certain electric appliances needing higher starting voltage. As for a lithium-ion battery, it has a risk of explosion. The United States even ban spare lithium-ion batteries of laptop computers in checked luggage when taking a flight. Therefore, there is a need to provide a charging device for a primary cell that can charge and rejuvenate the primary cell, and increase the output voltage.

SUMMARY OF THE INVENTION

A primary objective of the present invention is to provide a charging device for a primary cell that overcomes the disadvantages mentioned above. Another objective of the present invention is to provide a charging device that takes shorter time to charge a primary cell than to charge a secondary cell.

In order to achieve the aforementioned objectives, a charging device according to the present invention includes a transforming rectifying unit, a voltage current processing unit, a microprocessor, an agitating unit, a detecting unit and a display unit, for carrying out a charging operation to a battery set, wherein the battery set includes at least one primary cell, such as a zinc-manganese alkaline battery. The transforming rectifying unit receives an external input power source and then transforms the input power source into a direct-current output power source. The voltage current processing unit transforms the direct-current output power source into a direct-current power source and charging power source. The direct-current power source is used for power supplying the microprocessor, the agitating unit, the detecting unit and the display unit. The charging power source is used for charging the battery set. The detecting unit detects an output voltage of the battery set, produces a detecting signal and transfers the detecting signal to the microprocessor. The microprocessor controls an overall charging operation of the charging device according to the detecting signal, including making the agitating unit produce a sine pulse to chemically rejuvenate the battery set to remove the carbon deposition, and making the display unit show the charging status.

BRIEF DESCRIPTION OF THE DRAWINGS

The present invention will be apparent to those skilled in the art by reading the following detailed description of a preferred embodiment thereof, with reference to the attached drawing, in which:

FIG. 1 is a schematic diagram of a charging device according to the present invention.

DETAILED DESCRIPTION OF THE PREFERRED EMBODIMENT

Reference will now be made in detail to an embodiment of the present invention, examples of which are illustrated in the accompanying drawing.

Referring to FIG. 1, a charging device for a primary cell according to an embodiment of the present invention includes a transforming rectifying unit 10, a voltage current processing unit 20, a microprocessor 30, an agitating unit 40, a detecting unit 50, and a display unit 60, for charging and rejuvenating a battery set 70. The battery set 70 includes at least one primary cell, such as a zinc-manganese battery. The batteries of the battery set 70 are connected in parallel.

The transforming rectifying unit 10 receives an external input power source Vin and transforms the input power source Vin into a direct-current output power source. The input power source may be a power source of 110V alternating current, a power source of 220V alternating current or a power source of direct current, such as a universal serial bus (USB) power source of a voltage of 5V and a maximum current of 500 mA. The voltage current processing unit 20 transforms the direct-current output power source of the transforming rectifying unit 10 into a direct-current power source and a charging power source. The direct-current power source has a proper voltage to be used for power supplying the microprocessor 30, the agitating unit 40, the detecting unit 50 and the display unit 60. The charging power source is used for charging the battery set 70, and may have a voltage of 1.7V and a maximum current of 500 mA.

The microprocessor 30 is used for operating a controlling mode. The microprocessor 30 controls whether the voltage current processing unit 20 charges the battery set 70, including charging time, charging voltage and charging current. Before the charging device charges the battery set 70, the microprocessor 30 first controls the agitating unit 40 to produce a sine pulse so as to chemically activate and rejuvenate the battery set 70 to remove the carbon deposition. The carbon deposition is produced and accumulated in the batteries of the battery set 70 when the batteries discharge. The carbon deposition in the batteries increases an internal resistance and decrease an output voltage thereof. When the internal resistance reaches a critical value, the batteries are not able to provide the output voltage large enough to make the electronic appliance function normally.

The detecting unit 50 is used for detecting the output voltage of the battery set 70, producing a detecting signal and transferring the detecting signal to the microprocessor 30.

The microprocessor 30 determines an electrical status by the detecting signal. The electrical status includes one of whether charging should be carried out, whether charging is completed, whether the carbon deposition is not able to be removed and whether an anomaly occurs.

The controlling mode of the microprocessor 30 of the present invention includes: (1) charging is not carried out when the output voltage of the battery set 70 is lower than a first charging threshold voltage, the first charging threshold voltage may be 0.8V; (2) charging is carried out when the output voltage of the battery set 70 is higher than the first charging threshold voltage, using a voltage of 1.7V as a charging voltage and a current of 500 mA as a charging current; (3) a trickle charging is carried out when the output voltage of the battery set 70 is higher than a trickle charging threshold voltage, that is, the trickle charging maintains the original charging voltage and lowers the charging current, and the trickle charging threshold voltage may be 1.7V; (4) if the output voltage of the battery set 70 is lowered instead during a charging process, the battery set 70 is regarded as having an anomaly, and charging is terminated immediately; (5) if the charging process reaches a predetermined charging time, then the charging is completed, and the charging time may be 40 to 90 minutes; and (6) if charging is completed but the output voltage of the battery set 70 is lower than a second charging threshold voltage due to electrical leakage, the battery set 70 is charged again to carry out a recharging operation. The second charging threshold voltage is larger than the first charging threshold voltage.

The display unit 60 is controlled by the microprocessor 30 to display a charging status of the battery set 70. The display unit 60 may include a plurality of light emitting components (not shown), and the light emitting components include a first light emitting diode (LED) and a second light emitting diode (LED). A light color emitted by the first LED is different from that emitted by the second LED. For example, the first LED emits green light, and the second LED emits red light.

The charging status of the battery set 70 displayed by the display unit 60 includes: (1) when the microprocessor 30 has received the power supply and operated normally, the green LED is on; (2) when the battery set 70 is not suitable for charging or when the output voltage of the battery set 70 is lower than the first charging threshold voltage, such as 0.8V, the red LED sparkles; (3) if the carbon deposition of the battery set 70 is not able to be removed, the red LED sparkles; (4) if the carbon deposition of the battery set 70 is completely removed, the green LED is turned off and the red LED is continuously on for showing the charging is ongoing and the charging is normal; and (5) if charging of the battery set 70 is completed, the red LED is turned off and the green LED is continuously on.

It should be noticed that the ways the red LED and the green LED are on, such as being continuously on or sparkling, are merely exemplary examples for illustrating features of the present invention. It is not used for limiting the scope of the present invention. Therefore, the red LED and the green LED may have other shining ways.

The microprocessor 30 according to the present invention may further include a memory unit (not shown) for storing the electrical characteristics of the batteries, such as the first charging threshold voltages and the second charging threshold voltages. Meanwhile, it may store the optimal charging time the batteries require, so as to carry out an optimal charging operation in accordance with different batteries.

The microprocessor 30 according to the present invention may further include a circuit board (not shown), for configuring the transforming rectifying unit 10, the voltage current processing unit 20, the microprocessor 30, the agitating unit 40, the detecting unit 50, and the display unit 60. In addition, the microprocessor 30 may further include a housing (not shown), for covering the transforming rectifying unit 10, the voltage current processing unit 20, the microprocessor 30, the agitating unit 40, the detecting unit 50 and the display unit 60, so as to provide protection. The display unit is exposed out of the housing for providing a display function.

In order to further demonstrate the charging effect of the charging device according to the present invention, two primary cells (zinc-manganese batteries) are charged by the charging device and the measured data is listed in the following Table 1.

TABLE 1

| Xth time of charging | Charging since | Charging till | Voltage when stop charging | Voltage when stop working | No. of Flash | Output power ratio |
|---|---|---|---|---|---|---|
| 01 | 13:42 | 14:22 | 1.647 V | 1.345 V | 255 | 168% |
| 02 | 15:31 | 16:11 | 1.653 V | 1.340 V | 218 | 144% |
| 03 | 16:36 | 17:16 | 1.653 V | 1.351 V | 196 | 129% |
| 04 | 17:49 | 18:29 | 1.647 V | 1.351 V | 199 | 131% |
| 05 | 18:58 | 19:38 | 1.671 V | 1.352 V | 201 | 133% |
| 06 | 19:58 | 20:38 | 1.685 V | 1.347 V | 187 | 123% |
| 07 | 21:02 | 21:42 | 1.675 V | 1.339 V | 171 | 113% |
| 08 | 22:02 | 22:42 | 1.671 V | 1.391 V | 163 | 107% |
| 09 | 12:07 | 12:47 | 1.681 V | 1.343 V | 171 | 113% |
| 10 | 13:10 | 13:50 | 1.679 V | 1.355 V | 160 | 105% |
| 11 | 14:09 | 14:49 | 1.685 V | 1.339 V | 203 | 134% |
| 12 | 15:08 | 15:48 | 1.686 V | 1.358 V | 171 | 113% |
| 13 | 16:06 | 16:46 | 1.687 V | 1.350 V | 151 | 100% |
| 14 | 17:02 | 17:42 | 1.695 V | 1.345 V | 188 | 124% |
| 15 | 18:25 | 19:05 | 1.688 V | 1.371 V | 140 | 92% |
| 16 | 19:20 | 20:00 | 1.693 V | 1.368 V | 159 | 105% |
| 17 | 20:16 | 20:56 | 1.699 V | 1.355 V | 162 | 107% |
| 18 | 21:13 | 21:53 | 1.693 V | 1.352 V | 161 | 107% |
| 19 | 22:09 | 22:49 | 1.697 V | 1.354 V | 154 | 101% |
| 20 | 13:04 | 13:44 | 1.692 V | 1.398 V | 138 | 91% |
| 21 | 14:17 | 14:57 | 1.675 V | 1.357 V | 137 | 90% |
| 22 45 mins | 15:13 | 15:58 | 1.688 V | 1.359 V | 136 | 90% |
| 23 | 16:19 | 16:59 | 1.690 V | 1.360 V | 134 | 88% |
| 24 | 17:41 | 18:21 | 1.690 V | 1.380 V | 105 | 69% |
| 25 | 18:41 | 19:41 | 1.692 V | 1.362 V | 147 | 97% |

TABLE 1-continued

| Xth time of charging | Charging since | Charging till | Voltage when stop charging | Voltage when stop working | No. of Flash | Output power ratio |
|---|---|---|---|---|---|---|
| 60 mins | | | | | | |
| 26 | 19:57 | 20:37 | 1.688 V | 1.367 V | 136 | 90% |
| 27 | 20:52 | 21:32 | 1.700 V | 1.359 V | 143 | 94% |
| 28 | 13:31 | 14:11 | 1.692 V | 1.385 V | 121 | 80% |
| 29 | 14:25 | 15:05 | 1.702 V | 1.400 V | 111 | 73% |
| 30 | 15:20 | 16:00 | 1.695 V | 1.400 V | 109 | 72% |
| 31 | 16:13 | 17:13 | 1.709 V | 1.411 V | 113 | 74% |
| 60 mins | | | | | | |
| 32 | 17:25 | 18:05 | 1.705 V | 1.378 V | 102 | 67% |
| 33 | 18:20 | 19:00 | 1.704 V | 1.380 V | 89 | 58% |
| 34 | 19:15 | 19:55 | 1.709 V | 1.370 V | 140 | 92% |
| 35 | 20:18 | 20:58 | 1.695 V | 1.385 V | 112 | 74% |
| 36 | 13:25 | 14:05 | 1.701 V | 1.366 V | 106 | 70% |
| 37 | 15:56 | 16:36 | 1.705 V | 1.372 V | 121 | 80% |
| 38 | 16:57 | 17:37 | 1.690 V | 1.392 V | 129 | 85% |
| 39 | 17:56 | 18:36 | 1.694 V | 1.391 V | 113 | 74% |
| 40 | 14:11 | 14:51 | 1.692 V | 1.361 V | 140 | 92% |
| 41 | 15:08 | 15:48 | 1.710 V | 1.367 V | 121 | 80% |
| 42 | 16:02 | 16:42 | 1.712 V | 1.371 V | 131 | 86% |
| 43 | 19:41 | 20:21 | 1.703 V | 1.373 V | 116 | 76% |
| 44 | 20:36 | 21:16 | 1.707 V | 1.365 V | 125 | 82% |
| 45 | 21:31 | 22:11 | 1.713 V | 1.376 V | 119 | 78% |
| 46 | 22:26 | 23:06 | 1.711 V | 1.370 V | 114 | 75% |
| 47 | 11:35 | 12:15 | 1.691 V | 1.375 V | 116 | 76% |
| 48 | 12:28 | 13:08 | 1.699 V | 1.376 V | 133 | 88% |
| 49 | 13:22 | 14:02 | 1.709 V | 1.372 V | 106 | 70% |
| 50 | 16:32 | 17:12 | 1.716 V | 1.368 V | 116 | 76% |
| 51 | 17:28 | 18:08 | 1.711 V | 1.372 V | 120 | 80% |
| 52 | 19:17 | 19:57 | 1.709 V | 1.376 V | 116 | 76% |
| 53 | 20:16 | 20:56 | 1.702 V | 1.358 V | 116 | 76% |
| 54 | 21:16 | 22:16 | 1.715 V | 1.371 V | 115 | 76% |
| 60 mins | | | | | | |
| 55 | 22:31 | 23:11 | 1.712 V | 1.373 V | 133 | 88% |
| 56 | 12:24 | 13:04 | 1.708 V | 1.378 V | 117 | 77% |
| 57 | 13:13 | 13:53 | 1.705 V | 1.380 V | 110 | 72% |
| 58 | 14:08 | 14:48 | 1.710 V | 1.385 V | 138 | 91% |
| 59 | 15:05 | 15:45 | 1.707 V | 1.368 V | 110 | 72% |
| 60 | 16:00 | 16:40 | 1.708 V | 1.372 V | 109 | 72% |
| 61 | 16:55 | 17:35 | 1.706 V | 1.382 V | 117 | 77% |
| 62 | 17:58 | 18:38 | 1.710 V | 1.378 V | 102 | 67% |
| 63 | 18:50 | 19:30 | 1.715 V | 1.369 V | 123 | 81% |
| 64 | 19:50 | 20:30 | 1.740 V | 1.379 V | 105 | 69% |
| 65 | 21:04 | 21:44 | 1.720 V | 1.389 V | 87 | 57% |
| 66 | 12:07 | 12:47 | 1.736 V | 1.372 V | 133 | 88% |
| 67 | 12:59 | 13:39 | 1.742 V | 1.378 V | 138 | 91% |
| 68 | 16:16 | 16:56 | 1.738 V | 1.377 V | 115 | 76% |
| 69 | 17:16 | 17:56 | 1.746 V | 1.370 V | 125 | 82% |
| 70 | 19:37 | 20:17 | 1.731 V | 1.385 V | 118 | 78% |
| 71 | 22:22 | 23:02 | 1.741 V | 1.390 V | 108 | 71% |
| 72 | 16:10 | 16:50 | 1.726 V | 1.367 V | 130 | 86% |
| 73 | 17:03 | 17:43 | 1.732 V | 1.386 V | 103 | 68% |
| 74 | 18:02 | 18.42: | 1.736 V | 1.381 V | 110 | 72% |
| 75 | 18:56 | 19:36 | 1.730 V | 1.390 V | 125 | 82% |
| 76 | 19:50 | 20:30 | 1.725 V | 1.380 V | 135 | 89% |
| 77 | 20:44 | 21:24 | 1.741 V | 1.385 V | 138 | 91% |
| 78 | 21:45 | 22:25 | 1.732 V | 1.380 V | 103 | 68% |
| 79 | 22:40 | 23:20 | 1.728 V | 1.375 V | 106 | 70% |
| 80 | 23:40 | 24:20 | 1.739 V | 1.379 V | 121 | 80% |
| 81 | 13:11 | 13:51 | 1.744 V | 1.391 V | 123 | 81% |

In Table 1, two commercially available Duracell AA alkaline batteries are chosen as the battery set and the original output voltage is 1.611V. A commercially available EPSON digital camera is chosen as an electronic device. The Duracell AA alkaline batteries are installed in the EPSON digital camera. A flash unit of the camera is continuously activated until the output voltage of the Duracell AA alkaline batteries is too low to activate the flash unit. The numbers of flash of the flash unit is chosen as the reference value of capacity of the battery set. The normal operation voltage of the flash unit of the digital camera is 2.5V and the consumption current is 0.3 A. New alkaline batteries may activate the flash unit 151 times, and the lower limit of the operation voltage of the flash unit is 1.4V. From the first time to the twenty first time of charging of an alkaline battery, each charging time is 40 minutes. From the twenty second time to the twenty fourth time of charging, each charging time is increased to 45 minutes. From the twenty fifth time to the eighty first time of charging, each charging time is further increased to 60 minutes. It should be noticed that the charging time can be controlled by the microprocessor 30.

The measuring results of Table 1 show that the alkaline batteries activate the flash unit 255 times after the first time of charging, and it is 168% of new alkaline batteries. That is, after the first time of charging, capacity of the batteries increases about 68%. After the eighty first times of charging, the alkaline batteries can still activate the flash unit for 123 times, it is about 81% of new alkaline batteries. Therefore, the charging device according to the present invention certainly can charge the primary cell, such as the zinc-manganese alkaline batteries. Furthermore, the charging device may increase the capacity of the batteries after charging, and the batteries may be recharged over 100 times. Thus the charging device according to the present invention overcomes the disadvantages of conventional ones, and is environment friendly.

Although the present invention has been described with reference to the preferred embodiment thereof, it is apparent to those skilled in the art that a variety of modifications and changes may be made without departing from the scope of the present invention which is intended to be defined by the appended claims.

What is claimed is:

1. A charging device for carrying out a charging operation to a battery set, comprising:
    a transforming rectifying unit receiving an external input power source and transforming the input power source into a direct-current output power source;
    a voltage current processing unit transforming the direct-current output power source of the transforming rectifying unit into a direct-current power source and a charging power source;
    a microprocessor operating a controlling mode for controlling the charging operation of the battery set, wherein the controlling mode of the microprocessor comprises the following operations of:
        charging the battery set with a charging voltage and a charging current when an output voltage of the battery set is higher than a first charging threshold voltage;
        trickle charging the battery set with a trickle charging voltage identical to the charging voltage and a trickle charging current smaller than the charging current when the output voltage of the battery set is higher than a trickle charging threshold voltage;
        considering the battery set as having an anomaly and terminating the charging operation immediately if the output voltage of the battery set is lowered during the charging operation;
        terminating the charging operation if the charging operation reaches a predetermined charging time; and
        charging the battery set again if the output voltage is lower than a second charging threshold voltage that is larger than the first charging threshold voltage;
    an agitating unit controlled by the microprocessor and producing a sine pulse for chemically activating the battery set before carrying out the charging operation so as to remove carbon deposition inside of a battery of the battery set;
    a detecting unit detecting an output voltage of the battery set, producing a detecting signal and then transferring the detecting signal to the microprocessor, wherein the microprocessor determines an electrical status of the battery set according to the detecting signal, the electrical status comprises one of whether charging can be carried out, whether charging is completed, whether carbon deposition can not be removed, and whether an anomaly occurs; and
    a display unit controlled by the microprocessor to display a charging status of the battery set;
    wherein the battery set comprises at least one battery, the battery is a primary cell, the input power source is one of an alternating-current input power source and a direct-current input power source, the direct-current power source of the voltage current processing unit is used for power supplying the microprocessor, the agitating unit, the detecting unit and the display unit, and the charging power source is used for charging the battery set.

2. The charging device as claimed in claim 1, wherein the primary cell comprises a zinc-manganese alkaline battery.

3. The charging device as claimed in claim 1, wherein the alternating-current input power source comprises one of a power source of a 110V alternating current and a power source of a 220V alternating current, and the direct-current input power source comprises a universal serial bus (USB) power source of a voltage of 5V and a maximum current of 500 mA.

4. The charging device as claimed in claim 1, wherein the charging power source has a voltage of 1.7V and a maximum current of 500 mA.

5. The charging device as claimed in claim 1, wherein the first charging threshold voltage is 0.8V.

6. The charging device as claimed in claim 1, wherein the trickle charging threshold voltage is 1.7V.

7. The charging device as claimed in claim 1, wherein the predetermined charging time is 40 to 90 minutes.

8. The charging device as claimed in claim 1, wherein the display unit comprises a plurality of light emitting components, the light emitting components comprise a first light emitting diode (LED) and a second light emitting diode (LED), and a color light emitted by the first LED is different from a color light emitted by the second LED.

9. The charging device as claimed in claim 8, wherein the first LED is a green LED and the second LED is a red LED.

10. The charging device as claimed in claim 9, wherein the charging status of the battery set is displayed by the display unit according to the following conditions:
    when the microprocessor has received the power supply and operated normally, the green LED is on;
    when the battery set is not suitable for charging or when the output voltage of the battery set is lower than the first charging threshold voltage, the red LED sparkles;
    if the carbon deposition of the battery set can not be removed, the red LED sparkles;
    if the carbon deposition of the battery set is completely removed, the green LED is turned off and the red LED is continuously on for showing that the charging is ongoing and the charging is normal; and
    if the charging operation is completed, the red LED is turned off and the green LED is continuously on.

11. The charging device as claimed in claim 1, wherein the microprocessor further comprises a memory unit for storing electrical characteristics and optimal charging time of the battery set, the electrical characteristics comprise the first charging threshold voltage.

12. The charging device as claimed in claim 1, wherein the microprocessor further comprises a circuit board for configuring the transforming rectifying unit, the voltage current processing unit, the microprocessor, the agitating unit, the detecting unit and the display unit.

13. The charging device as claimed in claim 1, wherein the microprocessor further comprises a housing for covering the transforming rectifying unit, the voltage current processing unit, the microprocessor, the agitating unit, the detecting unit and the display unit, and exposing the display unit to provide a display function.

* * * * *